(12) United States Patent
Fukase et al.

(10) Patent No.: US 8,263,251 B2
(45) Date of Patent: Sep. 11, 2012

(54) INSULATING PLATE OF NONAQUEOUS ELECTROLYTE SECONDARY CELL, NONAQUEOUS ELECTROLYTE SECONDARY CELL, AND METHOD FOR PRODUCING INSULATING PLATE OF NONAQUEOUS ELECTROLYTE SECONDARY CELL

(75) Inventors: Yasuo Fukase, Fukushima (JP); Katsuhiko Watanabe, Fukushima (JP)

(73) Assignee: Sony Corporation, Tokyo (JP)

( * ) Notice: Subject to any disclaimer, the term of this patent is extended or adjusted under 35 U.S.C. 154(b) by 511 days.

(21) Appl. No.: 12/550,998

(22) Filed: Aug. 31, 2009

(65) Prior Publication Data
US 2010/0055555 A1 Mar. 4, 2010

(30) Foreign Application Priority Data
Sep. 1, 2008 (JP) .................................. 2008-223097

(51) Int. Cl.
*B01D 21/30* (2006.01)
*B01D 43/00* (2006.01)

(52) U.S. Cl. ........ 429/145; 429/498; 429/454; 429/456; 429/74; 429/80; 429/82; 429/535

(58) Field of Classification Search .................. 429/498, 429/454, 456, 74, 80, 825, 145, 535
See application file for complete search history.

(56) References Cited

U.S. PATENT DOCUMENTS
4,581,304 A * 4/1986 Beatty et al. ..................... 429/56
6,645,666 B1 * 11/2003 Moores et al. ................ 429/120
2005/0048365 A1 * 3/2005 Miyahisa et al. ............. 429/174

FOREIGN PATENT DOCUMENTS
| JP | HEI 10-012215 | 1/1998 |
| JP | 11097301 | 4/1999 |
| JP | HEI 11-350396 | 12/1999 |
| JP | 2003297301 | 10/2003 |
| JP | 2004-241251 | 8/2004 |

OTHER PUBLICATIONS
Japanese Office Action issued on Feb. 1, 2011, for corresponding Japanese Appln. No. 2008-223097.

* cited by examiner

*Primary Examiner* — Krishnan S Menon
*Assistant Examiner* — Allison M Gionta
(74) *Attorney, Agent, or Firm* — K&L Gates LLP

(57) ABSTRACT

An insulating plate of a nonaqueous electrolyte secondary cell is interposed between a cell element and a cover member in a nonaqueous electrolyte secondary cell including the cell element formed by stacking cathodes and anodes through separators, a cell can including a can body which houses the cell element and the cover member which closes an opening of the can body to seal the cell element, and an electrolyte injected into the cell can. The insulating plate includes a plate-shaped insulating plate body having insulating property, an injection hole which passes through the insulating plate body in the thickness direction and through which the electrolyte can be injected, and a filter member permeable to only the electrolyte and provided on one of the surfaces of the insulating plate body so as to cover the injection hole.

16 Claims, 15 Drawing Sheets

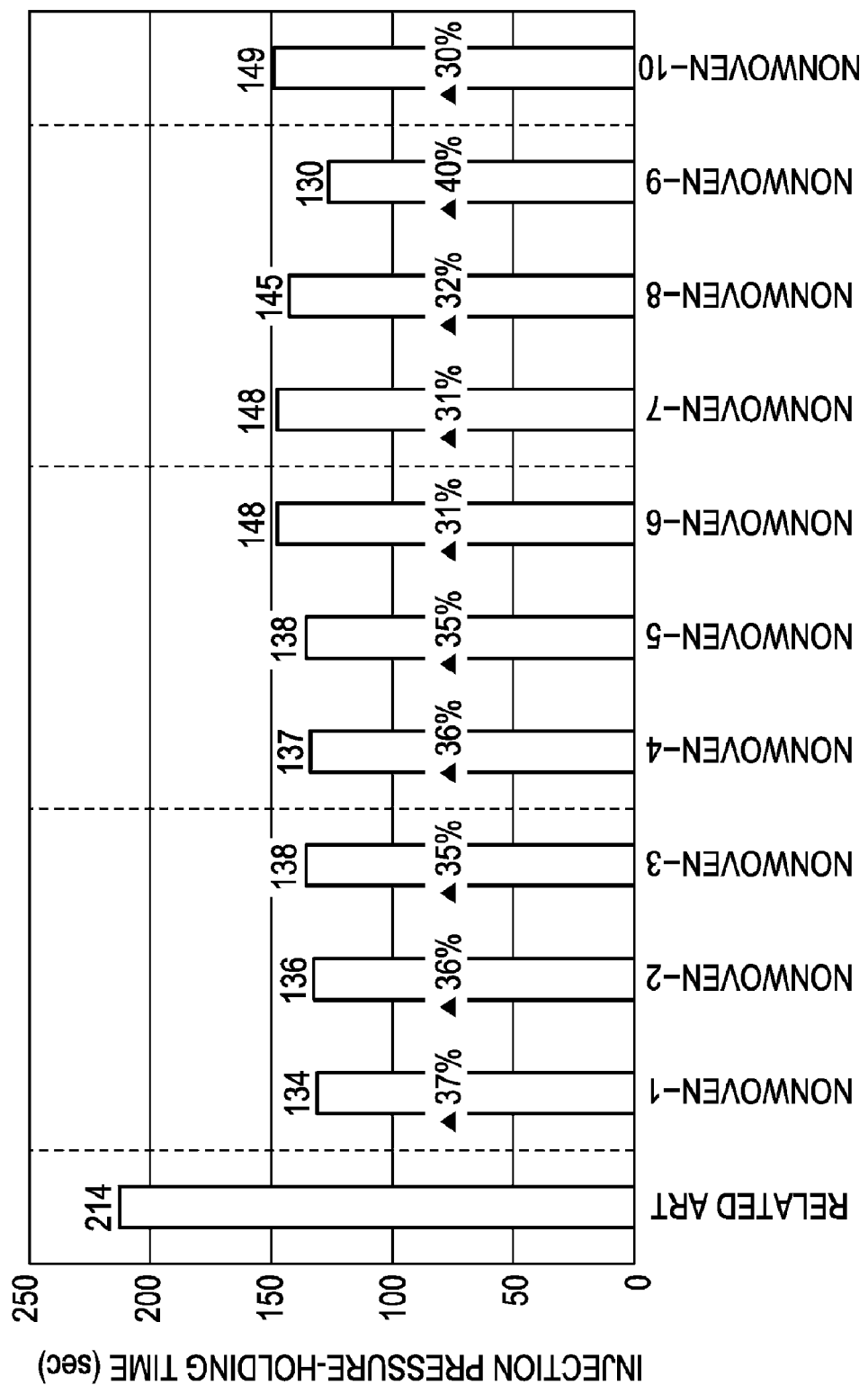

| LEVEL | UPPER PORTION | NONWOVEN MAXIMUM PORE SIZE | INJECTION TIME |
|---|---|---|---|
| | | $\mu$ | sec |
| 1 | INSULATING PLATE | | 214 |
| 2 | INSULATING PLATE + NONWOVEN FABRIC | 10 | 149 |
| 3 | INSULATING PLATE + NONWOVEN FABRIC | 30 | 134 |
| 4 | INSULATING PLATE + NONWOVEN FABRIC | 50 | 148 |
| 5 | INSULATING PLATE + NONWOVEN FABRIC | 70 | 130 |
| 6 | INSULATING PLATE + NONWOVEN FABRIC | 100 | 143 |

US18650G8 AVERAGE OF 5 TESTS

| LEVEL | UPPER INSULATING PLATE | UPPER NONWOVEN | NONWOVEN MAXIMUM PORE SIZE | DEPOSITS ON SEPARATOR |
|---|---|---|---|---|
| | MATERIAL, THICKNESS | PRESENT, ABSENT | $\mu$ | NUMBER OF POSITIONS |
| 1 | PP t0 4 | ABSENT | | 248 |
| 2 | PET t0.2 mm | PRESENT | 5 | 42 |
| 3 | PET t0.2 mm | PRESENT | 10 | 38 |
| 4 | PET t0.2 mm | PRESENT | 20 | 18 |
| 5 | PET t0.2 mm | PRESENT | 30 | 17 |
| 6 | PET t0.2 mm | PRESENT | 50 | 10 |
| 7 | PET t0.2 mm | PRESENT | 70 | 6 |
| 8 | PET t0.2 mm | PRESENT | 100 | 10 |
| 9 | PET t0.2 mm | PRESENT | 120 | 18 |
| 10 | PET t0.2 mm | PRESENT | 150 | 56 |
| 11 | PET t0.2 mm | PRESENT | 240 | 213 |

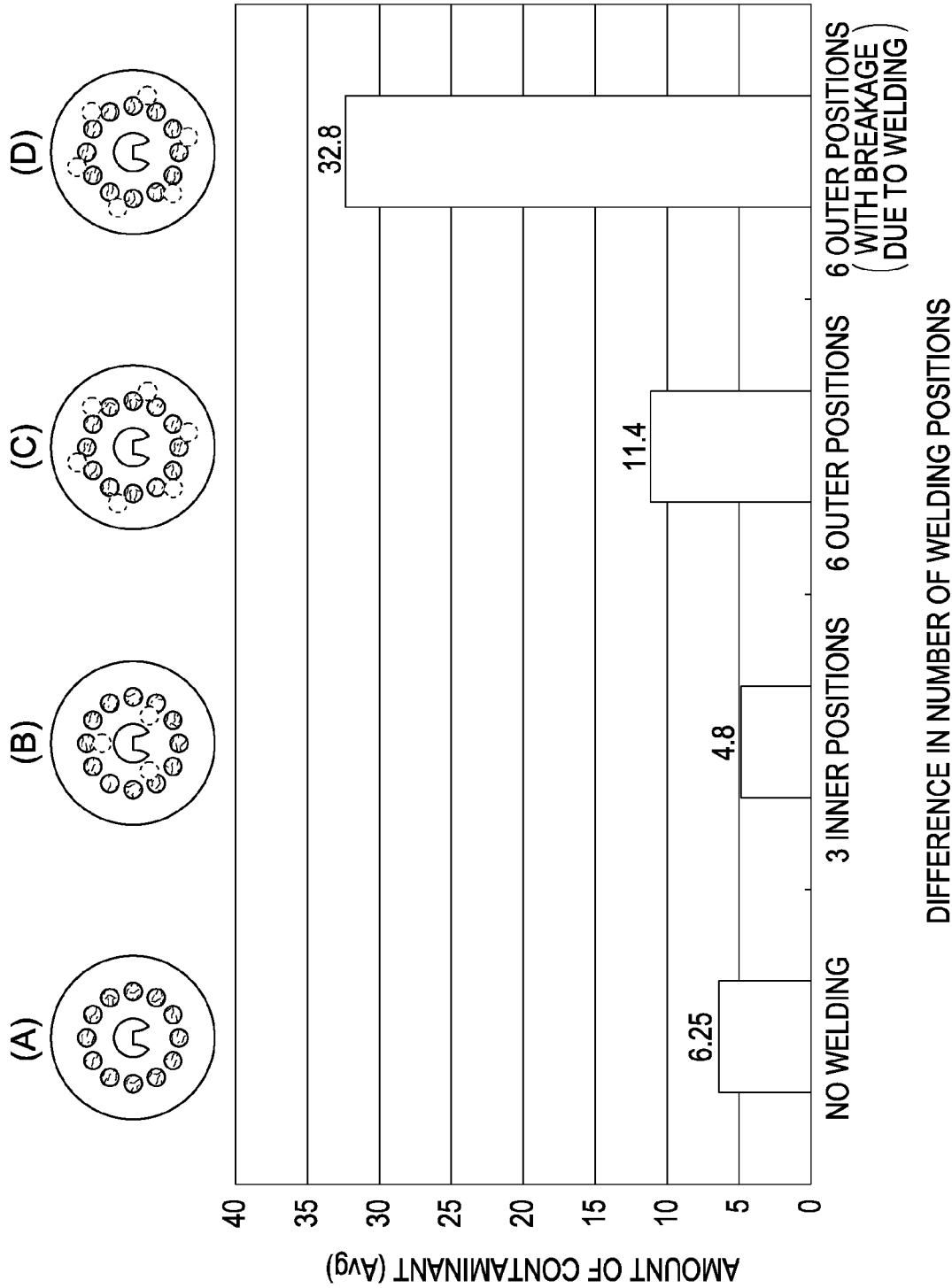

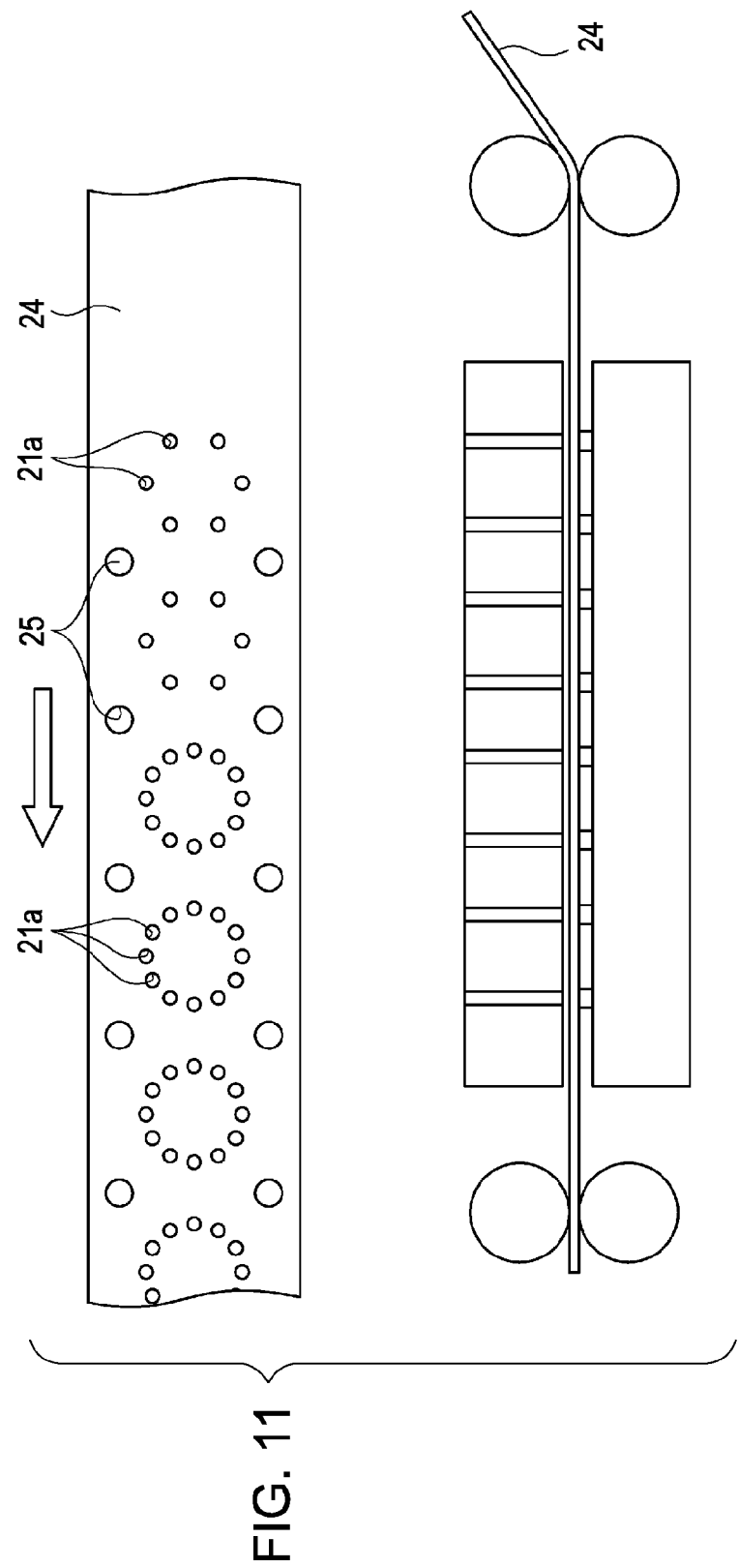

FIG. 14

US18650G8 AVERAGE OF 5 TESTS

| LEVEL | UPPER PORTION | NONWOVEN MAXIMUM PORE SIZE | NUMBER OF TIMES OF FALLING ON CONCRETE FROM 1.9 m UNTIL VOLTAGE DROP |
|---|---|---|---|
| | | $\mu$ | NUMBER OF TIMES |
| 1 | INSULATING PLATE | | 32 |
| 2 | INSULATING PLATE + NONWOVEN FABRIC | 10 | 41 |
| 3 | INSULATING PLATE + NONWOVEN FABRIC | 30 | 56 |
| 4 | INSULATING PLATE + NONWOVEN FABRIC | 70 | 28 |
| 5 | INSULATING PLATE + NONWOVEN FABRIC | 100 | 30 |
| 6 | NONWOVEN FABRIC | 10 | 23 |
| 7 | NONWOVEN FABRIC | 30 | 12 |
| 8 | NONWOVEN FABRIC | 70 | 8 |
| 9 | NONWOVEN FABRIC | 100 | 5 |

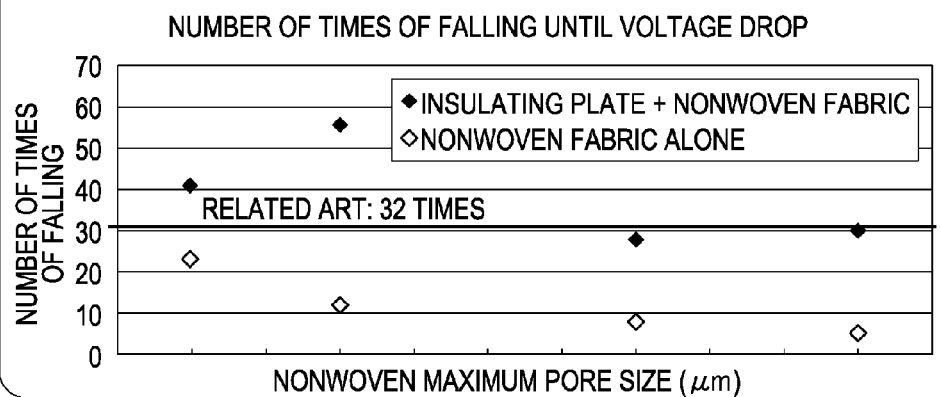

INSULATING PLATE OF NONAQUEOUS ELECTROLYTE SECONDARY CELL, NONAQUEOUS ELECTROLYTE SECONDARY CELL, AND METHOD FOR PRODUCING INSULATING PLATE OF NONAQUEOUS ELECTROLYTE SECONDARY CELL

CROSS REFERENCES TO RELATED APPLICATIONS

The present application claims priority to Japanese Priority Patent Application JP 2008-223097 filed in the Japan Patent Office on Sep. 1, 2008, the entire content of which is hereby incorporated by reference.

BACKGROUND

The present invention relates to an insulating plate of a nonaqueous electrolyte secondary cell, a nonaqueous electrolyte secondary cell, and a method for producing an insulating plate of a nonaqueous electrolyte secondary cell.

As shown in FIG. 16, a rolled nonaqueous electrolyte secondary cell (lithium ion cell) 100 includes a cell element 101 serving as a power generation element and a nonaqueous electrolyte solution 102 serving as a medium for moving ions between a cathode and an anode, the cell element 101 and the nonaqueous electrolyte solution 102 being housed in a cylindrical can body 103 with a bottom made of a conductive metal or the like. An opening of the can body 103 is sealed with a cover member 104 so that the inside is sealed in an airtight state.

The cell element 101 includes strip-shaped cathodes 105 formed by applying a cathode mixture coating solution, which is prepared by uniformly dispersing a cathode active material, a conductor, and a binder, to a cathode current collector and strip-shaped anodes 106 formed by applying an anode mixture coating solution, which is prepared by uniformly dispersing an anode active material, a conductor, and a binder, to an anode current collector. The strip-shaped cathodes 105 and the strip-shaped anodes 106 are stacked with separators 107 between the adjacent strip-shaped cathodes and anodes 105 and 106, and the stack is rolled in the longitudinal direction of the cell. In addition, an insulator 108 serving as an insulation member is disposed at the opening-side roll end. The cell element 101 is housed in the can body 103 together with the insulator 108.

The can body 103 is formed in a cylindrical shape with a bottom using, for example, iron, nickel, stainless steel, or the like. The opening of the can body 103 is sealed with the cover member 104 to form a cell can 109. Further, a bead portion 110 is provided as a constriction along the inner periphery near the opening of the can body 103 so as to be used for positioning when the cover member 104 is disposed. Therefore, the cover member 104 positioned on the bead portion 110 is attached to the can body 103 by bending inwardly the edge of the can body 103, which is positioned above the cover member 104, i.e., caulking.

The nonaqueous electrolyte secondary cell 100 is formed through the assembly step of housing the cell element 101 in the can body 103 of the cell can 109, and thus a space is provided between the cell element 101 ad the cell can 103.

For example, when the nonaqueous electrolyte secondary cell 100 is used for an electric tool, the cell element 101 three-dimensionally reciprocates in the cell can 103 due to vibration of the electric tool, thereby causing fracture, breakage, bending, or the like. As a result, the nonaqueous electrolyte secondary cell 100 may become unusable.

In order to resolve such a problem, therefore, there have been proposed a method of fixing the cell element 101 by caulking the can body 103 of the cell can 109 from the outside (for example, Japanese Unexamined Patent Application Publication No. 2003-297301), a method of fixing the cell element 101 by housing the cell element 101 in the can body 103 of the cell can 109 and then expanding the diameter of the cell element 101 from the inside to press the cell element 101 into contact with the inner surface of the can body 103 (for example, Japanese Unexamined Patent Application Publication No. 11-97301), etc.

SUMMARY

However, the technique described in Japanese Unexamined Patent Application Publication No. 2003-297301 may cause damage to the can body, thereby causing leakage of the electrolyte.

On the other hand, in the technique described in Japanese Unexamined Patent Application Publication No. 11-97301, the cell element is originally tightly rolled, and thus it is difficult to expand the diameter of the cell element to press the cell element into contact with the inner surface of the can body. If the diameter of the cell element is expanded so that the cell element is pressed into contact with the inner surface of the can body, a trouble such as cracking in the thin membrane cathode and anode, dropping of a portion of the active material layer, or the like may occur.

It is desirable to provide a nonaqueous electrolyte secondary cell in which a cell element can be securely fixed to a cell can to improve impact resistance and vibration resistance without causing leakage of an electrolyte and damage to the cell element.

An insulating plate of a nonaqueous electrolyte secondary cell according to an embodiment is interposed between a cell element and a cover member in a nonaqueous electrolyte secondary cell which includes the cell element formed by stacking cathodes and anodes through separators, a cell can including a can body which houses the cell element, and the cover member which closes an opening of the can body to seal the cell element, and an electrolyte injected into the cell can. The insulating plate includes a plate-shaped insulating plate body having insulating property, injection holes which pass through the insulating plate body in the thickness direction and through which the electrolyte can be injected, and a filter member permeable to only the electrolyte and provided on one of the surfaces of the insulating plate body so as to cover the injection holes.

In the insulating plate of the nonaqueous electrolyte secondary cell configured as described above, the injection holes are provided to pass through the plate-shaped insulating plate body having insulating property so that the electrolyte can be injected, and the filter member is provided on one of the surfaces of the insulating plate body so as to cover the injection holes. The filter member is interposed between the roll end of the cell element and the cover member which seals the opening of the can body when the cell element is housed in the can body of the cell can, the cell element being formed by stacking the cathodes and the anodes through the separators. Therefore, movement of the cell element is suppressed, thereby improving impact resistance and vibration resistance. Since the filter member is permeable to only the electrolyte, metal powder, such as iron powder or the like, which is produced by providing the bead portion on the can body can be prevented from entering the injection hole by the filter member when the electrolyte is injected. Further, the filter member is not separated from the insulating plate body, and thus the work of attaching the insulating plate can be easily performed.

In the insulating plate of a nonaqueous electrolyte secondary cell according to the embodiment, the insulating plate body is made of a thermoplastic resin such as PP, PET, PPS, or the like.

In this configuration of the insulating plate of a nonaqueous electrolyte secondary cell, the insulating plate body is made of a thermoplastic resin and thus can be welded with a nonwoven fabric of the same thermoplastic resin.

In the insulating plate of a nonaqueous electrolyte secondary cell according to the embodiment, the filter member is made of a nonwoven fabric composed of fibers of polyester, PPS, PBT, or the like, and has a maximum pore size of 20 to 120 μm and a Metsuke of 25 to 150 g/m2.

In this configuration of the insulating plate of a nonaqueous electrolyte secondary cell, the filter member is made of a nonwoven fabric and has a maximum pore size of 20 to 120 μm and a Metsuke of 25 to 150 g/m2. Therefore, the injection time of the electrolyte can be shortened, and contamination with iron powder or the like can be prevented.

In the insulating plate of a nonaqueous electrolyte secondary cell according to the embodiment, a binder is mixed in the filter member.

In this configuration of the insulating plate of a nonaqueous electrolyte secondary cell, the binder is mixed in the filter member, and thus the nonwoven fabric is not loosened.

In the insulating plate of a nonaqueous electrolyte secondary cell according to an embodiment, the filter member is pressed.

In this configuration of the insulating plate of a nonaqueous electrolyte secondary cell, the filter member is pressed, and thus the nonwoven fabric is not loosened.

In the insulating plate of a nonaqueous electrolyte secondary cell according to an embodiment, the insulating plate body and the filter member are partially welded by ultrasonic waves.

In this configuration of the insulating plate of a nonaqueous electrolyte secondary cell, the insulating plate body and the filter member are partially welded by ultrasonic waves, and thus the insulating plate can be integrally handled, and contamination with metal powder can be securely prevented.

In the insulating plate of a nonaqueous electrolyte secondary cell according to an embodiment, the injection holes are provided at positions inward of the caulking position for fixing the cover member to the can body, and the welding positions between the insulating plate body and the filter member are provided inward of the injection holes.

In this configuration of the insulating plate of a nonaqueous electrolyte secondary cell, the injection holes are provided at positions inward of the caulking position for fixing the cover member to the can body, and thus injection of the electrolyte is not hindered by the bead portion, achieving high workability. In addition, the welding positions between the insulating plate body and the filter member are provided inward of the injection holes, and thus the filter member can be prevented from rising from the insulating plate due to bending of the insulating plate when the bead portion is formed, thereby securely preventing contamination through a gap.

In the insulating plate of a nonaqueous electrolyte secondary cell according to an embodiment, the physical property values of the insulating plate body are close to those of the filter member.

In this configuration of the insulating plate of a nonaqueous electrolyte secondary cell, the physical property values of the insulating plate body are close to those of the filter member, and thus the insulating plate body and the filter member show the same behaviors. Therefore, deformation, falling, and the like can be prevented, and contamination with metal powder can be securely inhibited.

A nonaqueous electrolyte secondary cell according to an embodiment includes a cell element formed by stacking cathodes and anodes through separators, a cell can including a can body which houses the cell element, and a cover member which closes an opening of the can body to seal the cell element, an insulating plate interposed between the cell element and the cover member, and an electrolyte injected into the cell can through injection holes provided in the insulating plate.

In the nonaqueous electrolyte secondary cell configured as described above, the cell element formed by stacking the cathodes and the anodes through the separators is housed in the can body of the cell can, and the insulating plate is interposed between the cell element and the cover member which closes an opening of the can body. The insulating plate includes a plate-shaped insulating plate body having insulating property, injection holes which pass through the insulating plate body and through which the electrolyte can be injected, and a filter member provided on one of the surfaces of the insulating plate body. Therefore, metal powder can be securely prevented from entering the cell element when the electrolyte is injected, thereby securely preventing internal short circuiting and appropriately utilizing the performance of the cell. The filter member is interposed between the roll end of the cell element and the cover member which seals the opening of the can body when the cell element is housed in the can body of the cell can. Therefore, movement of the cell element is suppressed, thereby improving impact resistance and vibration resistance.

A nonaqueous electrolyte secondary cell according to an embodiment includes a cell element formed by stacking cathodes and anodes through separators, a cell can including a can body which houses the cell element and a cover member which closes an opening of the can body to seal the cell element, an electrolyte injected into the cell can, an insulating plate interposed between the cell element and the cover member, and a nonwoven fabric provided between the cell element and the bottom of the cell can.

In the nonaqueous electrolyte secondary cell configured as described above, the cell element formed by stacking the cathodes and the anodes through the separators is housed in the can body of the cell can, and the insulating plate is interposed between the cell element and the cover member. The insulating plate includes the plate-shaped insulating plate body having insulating property, the injection holes which pass through the insulating plate body and through which the electrolyte can be injected, and the filter member provided on one of the surfaces of the insulating plate body so as to cover the injection holes. Therefore, metal powder produced when a bead portion is formed can be securely prevented from entering the cell element when the electrolyte is injected, thereby securely preventing internal short circuiting and appropriately utilizing the performance of the cell. In addition, the nonwoven fabric is provided between the cell element and the bottom of the cell can, and thus metal powder produced when the can bottom is welded can be prevented from entering from the lower end of the cell element. The filter member and the nonwoven fabric are interposed between the roll end of the cell element and the cover member or between the roll end and the bottom of the can body when the cell element is housed in the can body of the cell can.

Therefore, movement of the cell element is suppressed, thereby improving impact resistance and vibration resistance.

A method for producing an insulating plate of a nonaqueous electrolyte secondary cell according to an embodiment is a method for producing an insulating plate of a nonaqueous electrolyte secondary cell which includes a cell element formed by stacking cathodes and anodes through separators, a cell can including a can body which housed the cell element, and a cover member which closes an opening of the can body to seal the cell element, an insulating plate interposed between the cell element and the cover member, and an electrolyte injected into the cell can through injection holes provided in the insulating plate. The method includes forming the injection holes in a sheet-like base material for the insulating plate body of the insulating material, partially fixing together the base material for the insulating plate body and a sheet-like filter base material laminated thereon by ultrasonic welding to form an insulating plate base material, and then forming the insulating plate base material into a predetermined shape to produce the insulating plate.

In this configuration of the method for producing an insulating plate of a nonaqueous electrolyte secondary cell, the injection holes are formed in the sheet-like base material for the insulating plate body of the insulating plate, and then the base material for the insulating plate body and the sheet-like filter base material laminated thereon are fixed together by ultrasonic welding to form the insulating plate base material. Therefore, the base material for the insulating plate body and the filter base material can be integrally handled, thereby achieving high workability. Then, the insulating plate base material is formed into the predetermined shape to produce the insulating plate. Therefore, the insulating plate provided with the filter member can be produced.

According to the present invention, injection holes are provided to pass through a plate-shaped insulating plate body having insulating property so that an electrolyte can be injected, and a filter member is provided on one of the surfaces of the insulating plate body to cover the injection holes. When a cell element formed by stacking cathodes and anodes through separators is housed in the can body of the cell can, the filter member is interposed between the roll end of the cell element and the cover member which closes an opening of the can body. Therefore, movement of the cell element is suppressed, thereby improving impact resistance and vibration resistance. In addition, since the filter member is permeable to only the electrolyte, metal powder, such as iron powder, which is produced by providing a bead portion in the can body, can be prevented from entering the injection holes by the filter member when the electrolyte is injected. Further, the filter member is not separated from the insulating plate body, and thus the effect of facilitating the work of attaching the insulating plate can be achieved.

Additional features and advantages are described herein, and will be apparent from the following Detailed Description and the figures.

BRIEF DESCRIPTION OF THE FIGURES

FIG. 2 is a graph showing comparison of the electrolyte injection times between a case where a nonwoven fabric is used for an insulating plate and a case where a nonwoven fabric is not used;

FIG. 9 is a graph showing adhesion in the examples shown in FIG. 8;

FIG. 11 shows a plan view and a side view showing a process of producing a base material for an insulating plate body;

FIG. 14 shows a table and a graph showing comparison of the number of times of falling until voltage drop between the case where an insulating plate is provided between a cell element and a cover member and the case where only a nonwoven fabric is provided to a case where a related-art insulating plate is used;

DETAILED DESCRIPTION

The present application is described in detail below with reference to the drawings according to an embodiment.

Figure 1A:
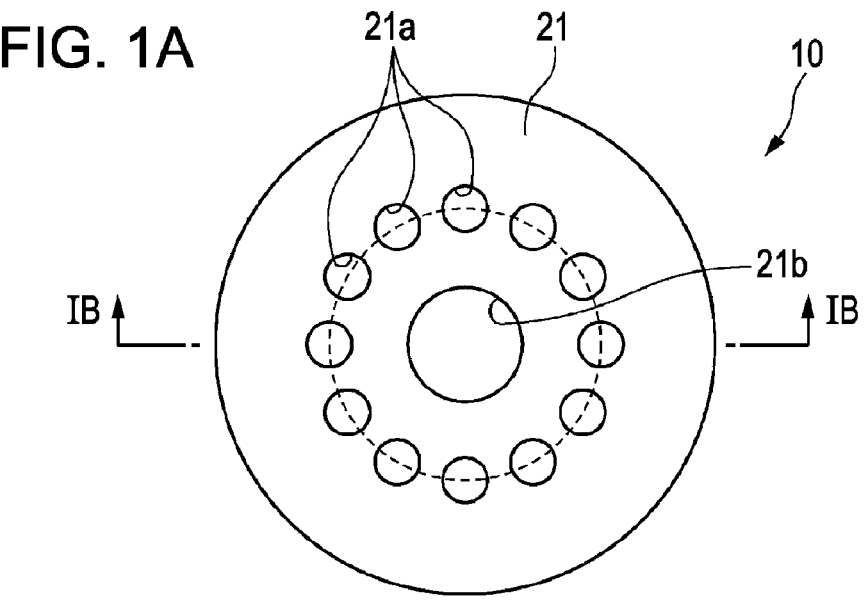
FIG. 1A is a plan view of an insulating plate of a nonaqueous electrolyte secondary cell according to an embodiment.
Figure 1B:
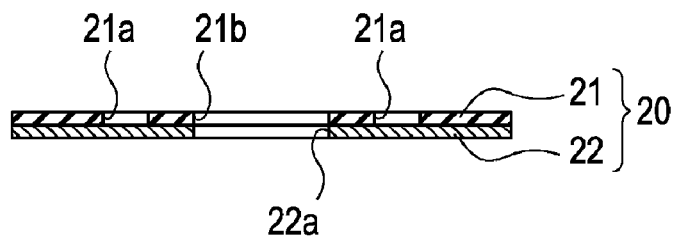
FIG. 1B is a sectional view taken along line IB-IB in FIG. 1A.
Figure 1C:
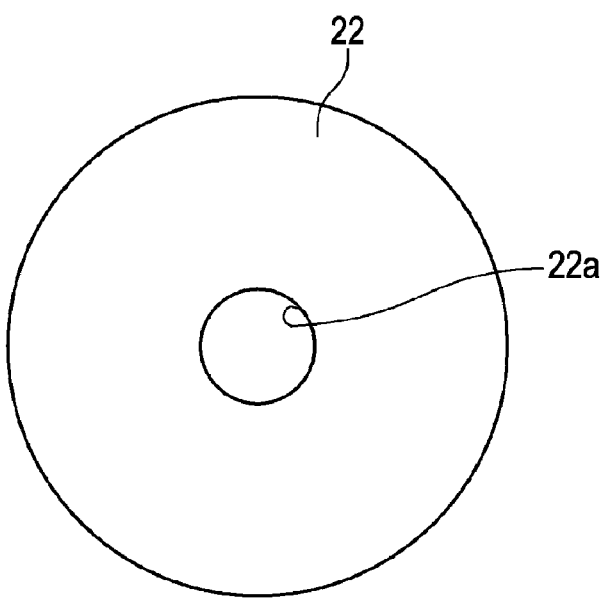
FIG. 1C is a plan view of a filter member.
Figure 3:
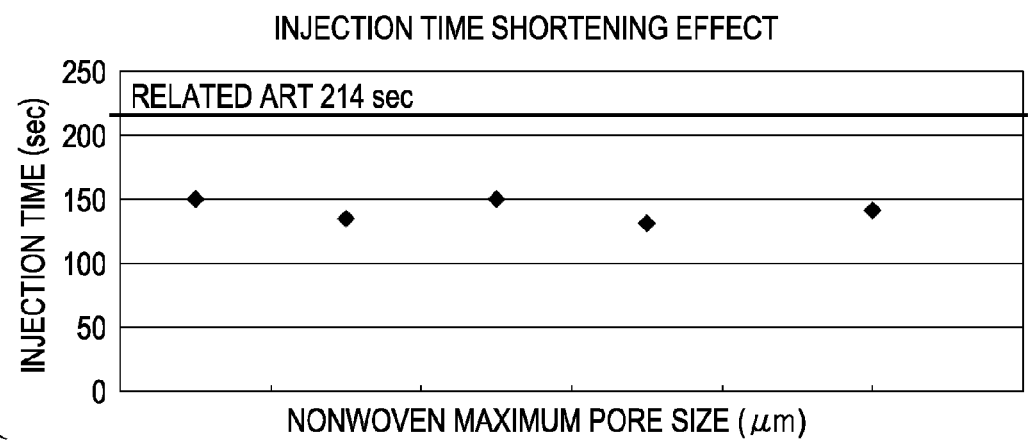
FIG. 3 shows a table and a graph showing the influence of nonwoven fabric maximum pore size on the electrolyte injection time.
Figure 4:
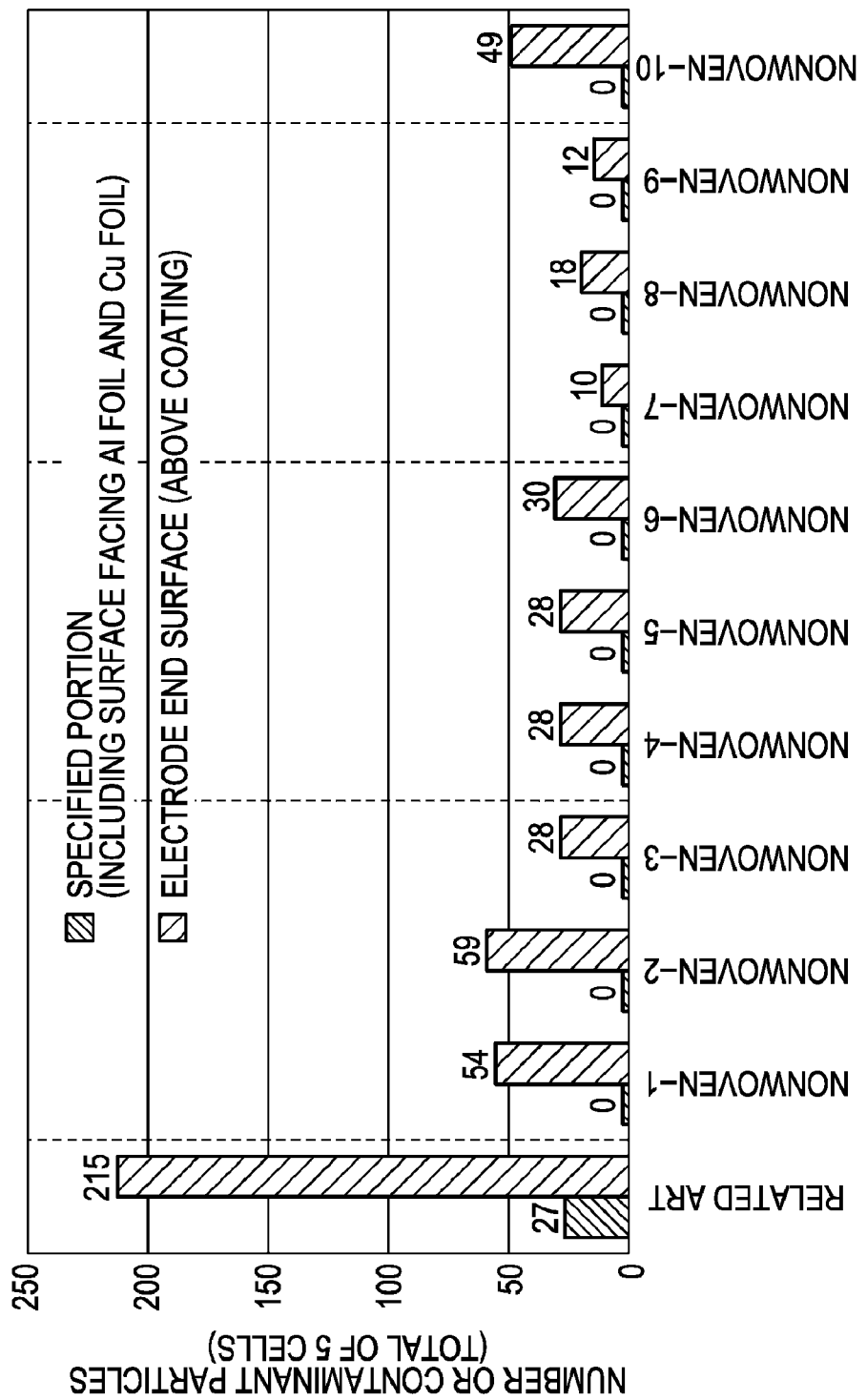
FIG. 4 is a graph showing comparison of the amounts of contaminants entering between a case where a nonwoven fabric is used for an insulating plate and a case where a nonwoven fabric is not used.
Figure 5:
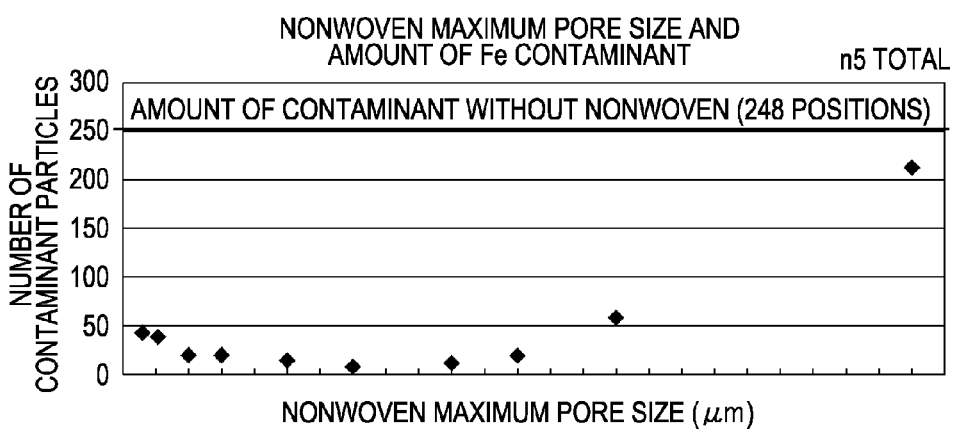
FIG. 5 shows a table and a graph showing the influence of nonwoven fabric maximum pore size on the amount of contaminants entering.
Figure 6:
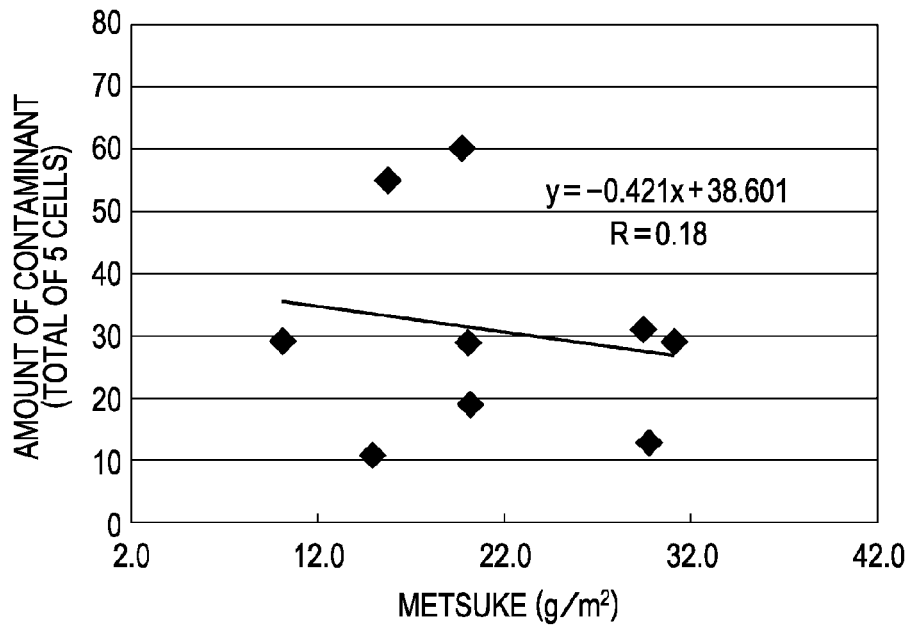
FIG. 6 is a graph showing a relationship between the Metsuke of a filter member and the amount of contaminant entering.
Figure 7:
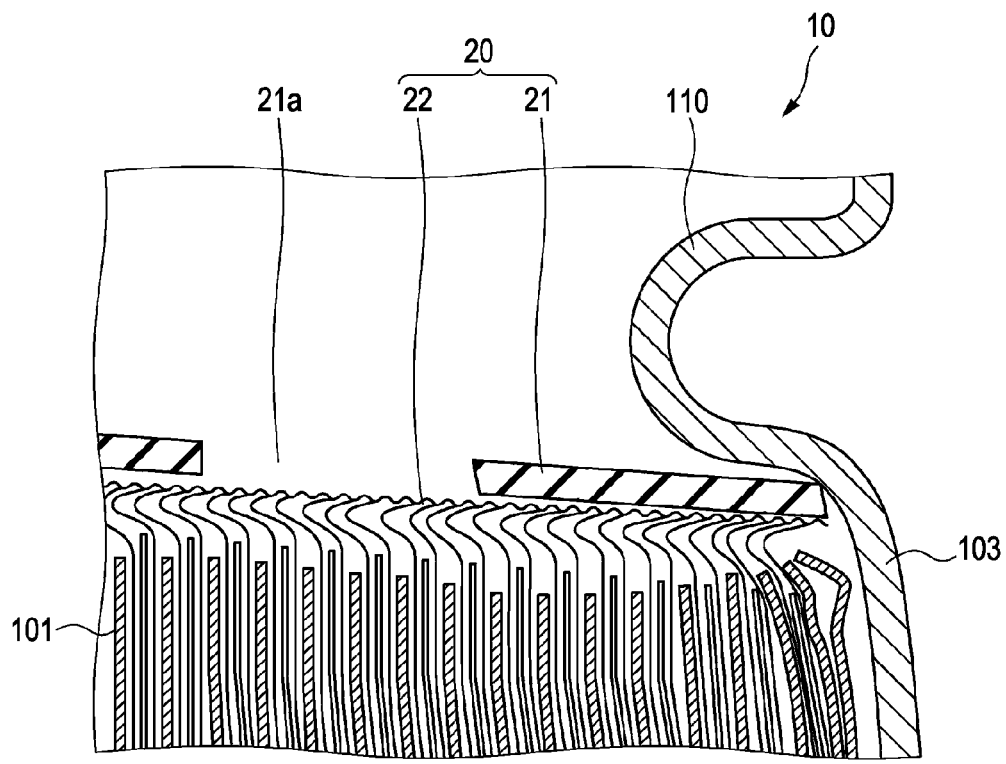
FIG. 7 is a sectional view showing a positional relationship between injection holes in an insulating plate and a bead portion.
Figure 8:
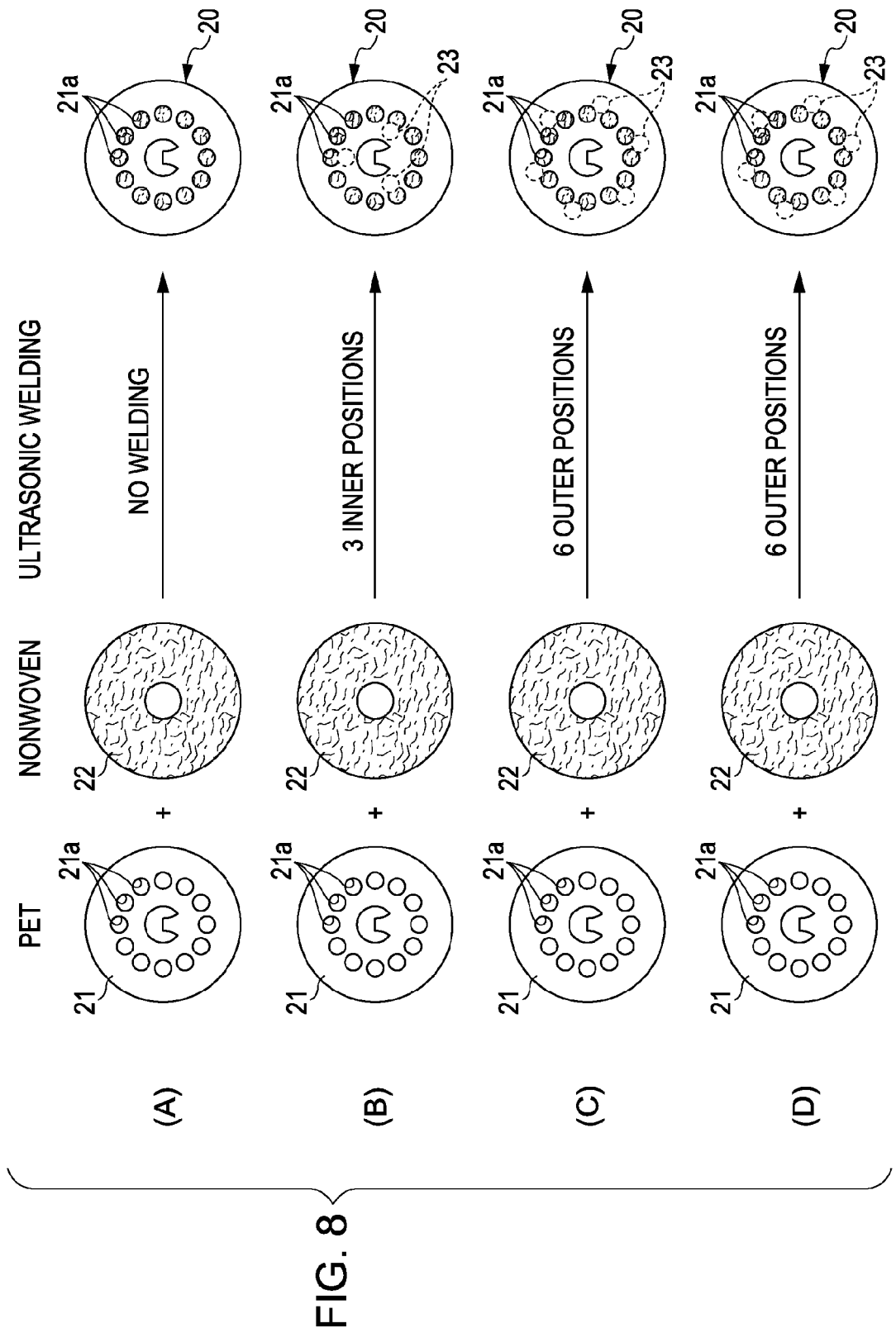
FIG. 8 is a plan view showing examples of the number of welding positions between an insulating plate body and a filter member.

FIG. 1A is a plan view of an insulating plate of a nonaqueous electrolyte secondary cell according to an embodiment, FIG. 1B is a sectional view taken along line IB-IB in FIG. 1A, and FIG. 1C is a plan view of a filter member. FIG. 2 is a graph showing comparison of the electrolyte injection times between a case where a nonwoven fabric is used for an insulating plate and a case where a nonwoven fabric is not used. FIG. 3 shows a table and a graph showing the influence of nonwoven fabric maximum pore size on the electrolyte injection time. FIG. 4 is a graph showing comparison of the amounts of contaminants entering between a case where a nonwoven fabric is used for an insulating plate and a case where a nonwoven fabric is not used. FIG. 5 shows a table and a graph showing the influence of nonwoven fabric maximum pore size on the amount of contaminants entering. FIG. 6 is a graph showing a relationship between the Metsuke of a filter member and the amount of contaminant entering. FIG. 7 is a sectional view showing a positional relationship between injection holes in an insulating plate and a bead portion. FIG. 8 is a plan view showing examples of the number of welding positions between an insulating plate body and a filter member. FIG. 9 is a graph showing adhesion in the examples shown in FIG. 8.

Figure 16:
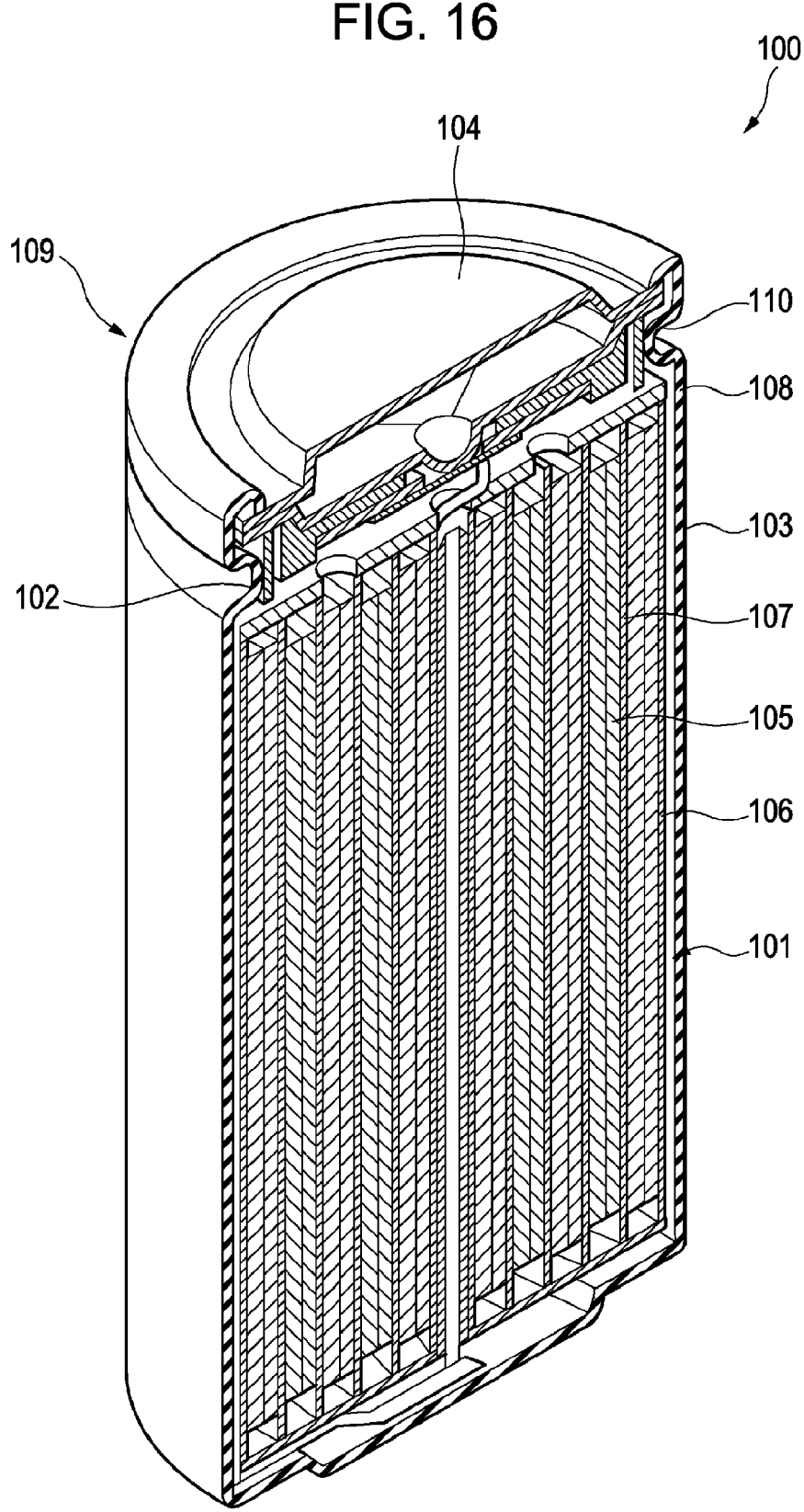
FIG. 16 is a partially cut-away perspective view showing a usual rolled nonaqueous electrolyte secondary cell.

Portions common to the above-mentioned nonaqueous electrolyte secondary cell 100 shown in FIG. 16 are denoted by the same reference numerals, and duplicated description is omitted.

As described above with reference to FIG. 16, an insulating plate 20 of a nonaqueous electrolyte secondary cell 10 according to an embodiment is interposed between a cell element 101 and a cover member 104 in the nonaqueous electrolyte secondary cell 10 which includes a cell can 109 including a can body 103 which houses the cell element 101, and the cover member 104 which closes an opening of the can body 103 to seal the cell element 101, and a nonaqueous electrolyte 102 injected into the cell can 109.

As shown in FIGS. 1A and 1B, the insulating plate 20 of the nonaqueous electrolyte secondary cell 10 according to an embodiment includes a plate-shaped insulating plate body 21 having insulating property and a filter member 22 permeable to only the electrolyte 102 and provided on one of the surfaces of the insulating plate body 21. It is preferred that the insulating plate body 21 and the filter member 22 are partially welded by ultrasonic waves. Therefore, the insulating plate 20 including the insulating plate body 21 and the filter member 22 can be integrally handled. Also, the physical property values of the insulating plate body 21 are preferably close to those of the filter member 22. As a result, the insulating plate body 21 and the filter member 22 show the same behaviors, thereby preventing the occurrence of a gap, dropping, and the like.

As shown in FIG. 1A, the insulating plate body 21 has injection holes 21a which pass through in the thickness direction and through which the electrolyte 102 can be injected, and a central hole 21b provided at the center. On the other hand, as shown in FIG. 1C, the filter member 22 has only a central hole 22a provided at the center to pass through the filter member 22. Therefore, in the insulating plate 20, a through hole is provided at the center, while the injection holes 21a of the insulating plate body 21 are covered with the filter member 22.

The insulating plate body 21 is preferably made of a thermoplastic resin such as PP, PET, PPS, or the like, and thus can be welded with a nonwoven fabric of the same thermoplastic resin.

FIG. 2 shows comparison of the injection times of the electrolyte 102 between a related-art insulating plate not including a nonwoven fabric and nonwoven fabrics of various specifications. FIG. 2 indicates that the injection time of the electrolyte 102 using a nonwoven fabric can be shortened by 30 to 40% as compared with the case using the related-art insulating plate. Therefore, the production time of the nonaqueous electrolyte secondary cell 10 can be shortened using a nonwoven fabric. FIG. 3 indicates that the effect on the injection time is little influenced by changes of the maximum pore size of a nonwoven fabric.

As shown in FIG. 4, comparison of the amounts of contaminants, such as iron powder or the like, indicates that the amount of iron powder entering when a nonwoven fabric is used is smaller than that when the related-art insulating plate is used. However, as shown in FIG. 5, the effect decreases when the maximum pore size of a nonwoven fabric increases to some extent. In addition, FIG. 6 indicates that when the Metsuke is 20 or more, the amount of contaminants entering tends to decrease.

Therefore, preferably, the filter member 22 is made of a nonwoven fabric composed of fibers of polyester, PPS, PBT, or the like, and has a maximum pore size of 20 to 120 μm and a Metsuke of 25 to 150 g/m2. The nonwoven fabric is preferably flexible so that it can be supported to adhere to the irregular end surface of the roll of the cell element 101.

As shown in FIG. 7, the injection holes 21a provided in the insulating plate 20 are preferably disposed inward of the caulking position for fixing the cover member 104 to the can body 103 (i.e., inward of the bead portion 110). In this case, injection of the electrolyte 102 is not hindered by the bead portion 110, thereby achieving high workability.

In addition, welding positions 23 between the insulating plate body 21 and the filter member 22 are preferably inward of the injection holes 21. That is, if the welding positions 23 are disposed on the outside (peripheral portion), the filter member 22 rises from the insulating plate body 21 due to bending of the insulating plate 20 when the bead portion 110 is formed, and thus contaminants may enter through a gap. Therefore, the welding positions 23 are preferably provided inward of the injection holes 21a.

Further, a comparison is made of the amount of contaminants entering between the cases (A) to (D) shown in FIG. 8. In FIG. 8, (A) shows the case in which the insulating plate body 21 and the filter member 22 are not welded, (B) shows the case in which welding is performed at three positions inward of the injection holes 21a, (C) shows the case in which welding is performed at six positions outward of the injection holes 21a, and (D) shows the same case as (C) except holes occur due to welding.

As a result, as shown in FIG. 9, when welding is performed at three positions inward of the injection holes 21a as shown by (B) in FIG. 8, the amount of contaminants entering is minimized. Therefore, the three welding positions 23 are provided inward of the injection holes 21a.

In addition, a binder is preferably mixed in the filter member 22. As a result, loosening of the nonwoven fabric can be prevented.

Alternatively, the filter member 22 is preferably pressed in order to prevent loosening. Examples of pressing include calender pressing in which sheets are laminated in a number corresponding to the thickness of a product, held between metal panels, and heat-fused by heating and pressing with a press, point sealing, and the like.

Next, the method for producing the insulating plate 20 is described.

Figure 10A:
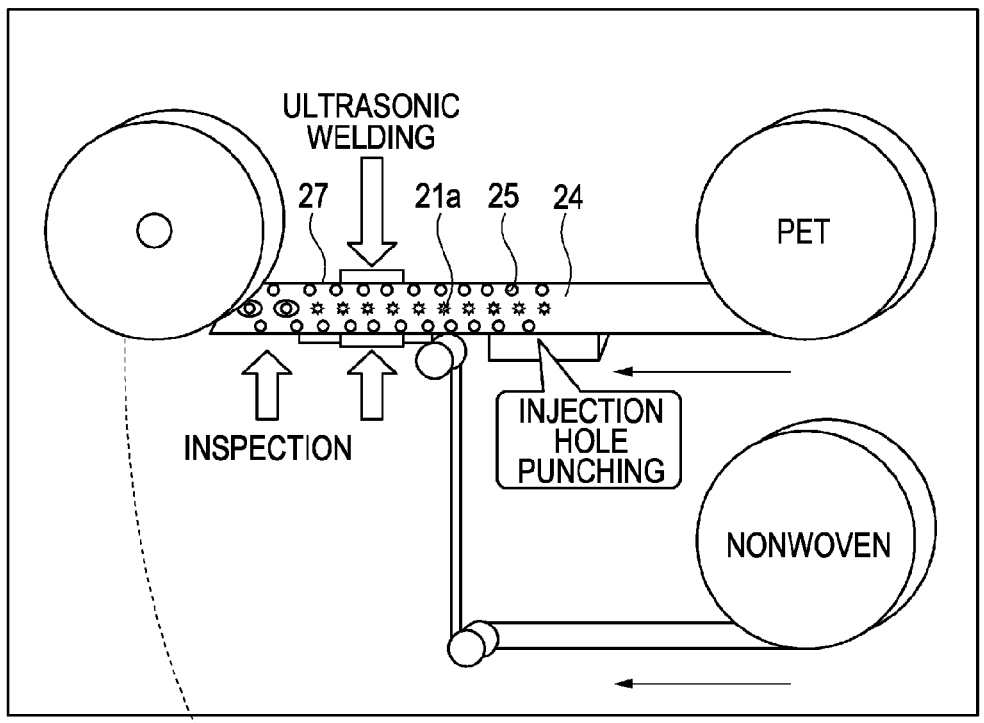
FIG. 10A is a drawing of a process of producing an insulating plate base material by welding an insulating plate body and a filter member.
Figure 10B:
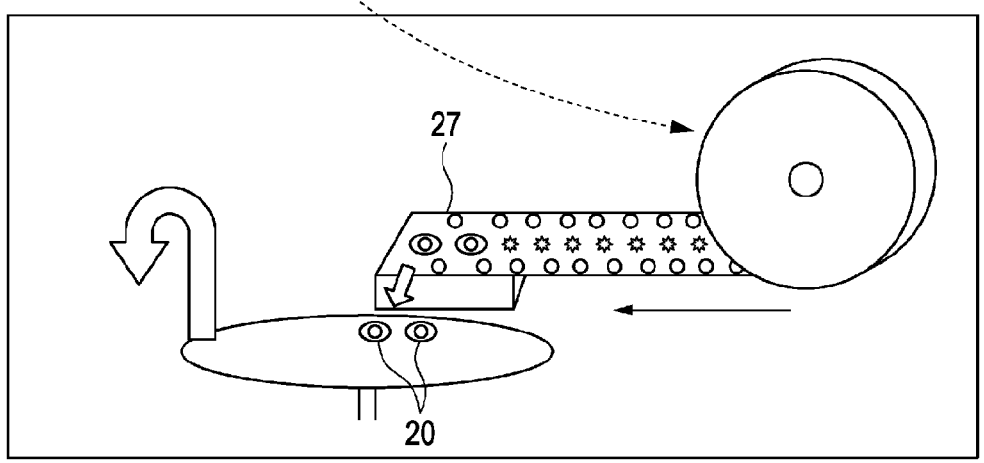
FIG. 10B is a drawing of a process of punching out an insulating plate from the insulating plate base material.
Figure 12:
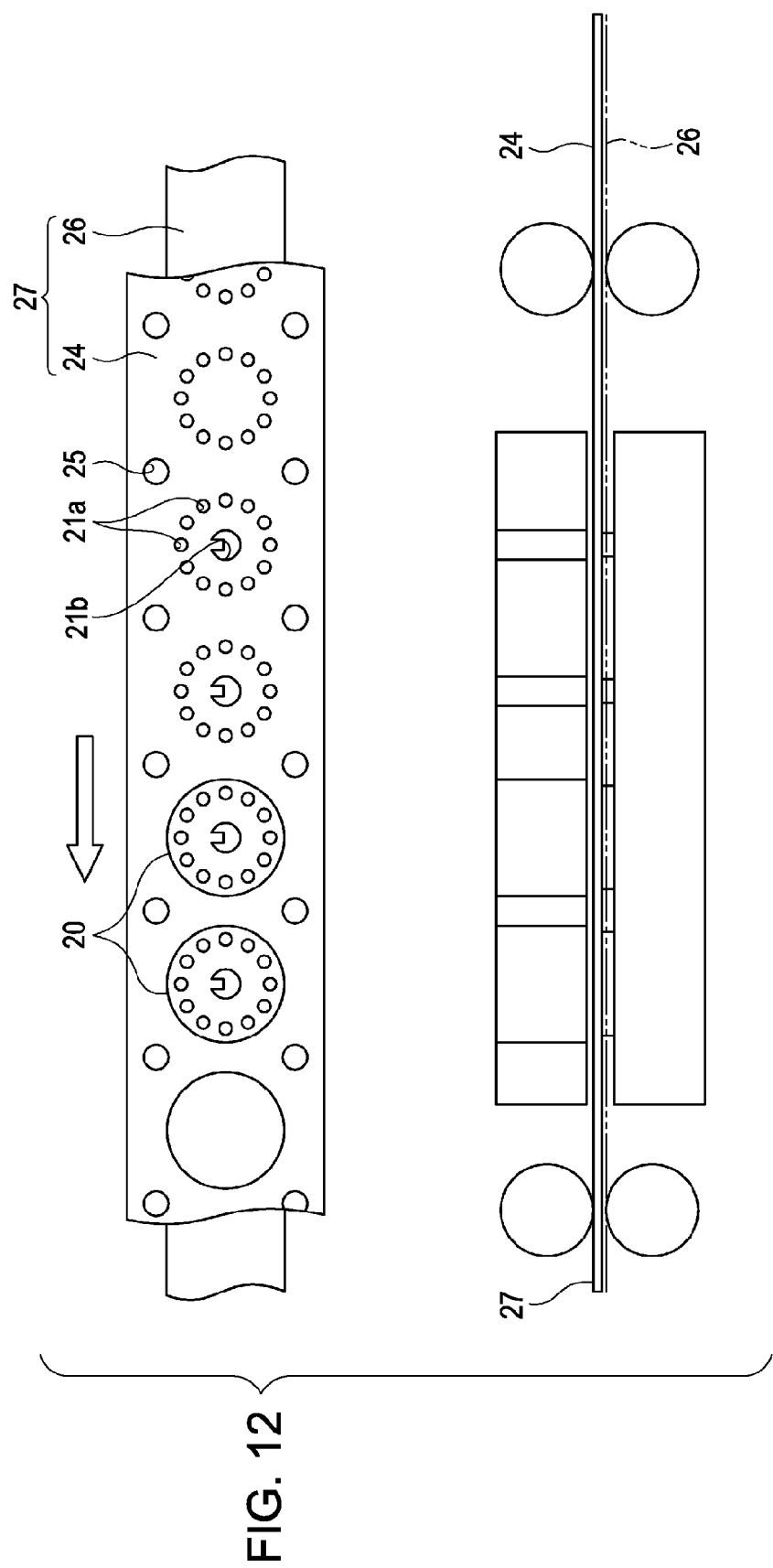
FIG. 12 shows a plan view and a side view showing a process of punching out an insulating plate.

FIG. 10A is a drawing of a process of producing an insulating plate base material in which the insulating plate body 21 and the filter member 22 are welded, and FIG. 10B is a drawing of a process of punching out an insulating plate from the insulating plate base material. FIG. 11 shows a plan view and a side view showing a process of producing a base material for the insulating plate body. FIG. 12 shows a plan view and a side view showing a process of punching out an insulating plate;

As shown in FIGS. 10A and 11, first, the injection holes 21a are punched in the base material 24 for the insulating plate body composed of PET formed in a tape shape. These figures show the case in which two insulating plates 20 are produced each time (2-pitch feed). In addition, 6 injection holes 21a are punched two times to form 12 injection holes 21a. At the same time, pilot holes 25 are also punched. After the injection holes 21a are formed, a filter base material 26 composed of a nonwoven fabric processed into a tape shape is laminated on the lower surface of the insulating plate body base material 24, and the insulating plate body base material 24 and the filter base material 26 are partially fixed together by ultrasonic welding to form an insulating plate base material 27 (refer to FIG. 12), followed by rolling. In this case, as described above, the three welding positions are provided inward of the injection holes 21*a*.

Next, as shown in FIGS. 10B and 12, the center holes 21*b* are punched in the insulating plate base material 27, and then the insulating plate base material 27 are punched in a predetermined shape to produce two insulating plates 20 each time.

In the insulating plate of the nonaqueous electrolyte secondary cell described above, the injection holes 21*a* are provided to pass through the plate-shaped insulating plate body 21 having insulating property so that the electrolyte 102 can be injected, and the filter member 22 is provided on one of the surfaces of the insulating plate body 21 so as to cover the injection holes 21*a*. The filter member 21 is interposed between the roll end of the cell element 101 and the cover member 104 which seals the opening of the can body 103 when the cell element 101 is housed in the can body 103 of the cell can 109, the cell element 101 being formed by stacking the cathodes 105 and the anodes 106 through the separators 107. Therefore, movement of the cell element 101 in the cell can 109 is suppressed, thereby improving impact resistance and vibration resistance. Since the filter member 22 is permeable to only the electrolyte 102, contaminants, such as iron powder or the like, which is produced by providing the bead portion 110 on the can body 103 can be prevented from entering the injection holes 21*a* by the filter member 22 when the electrolyte 102 is injected. Further, the filter member 22 is not separated from the insulating plate body 21, and thus the work of attaching the insulating plate 20 can be easily performed.

The method for producing the insulating plate of the nonaqueous electrolyte secondary cell includes forming the injection holes 21*a* in the sheet-like base material 24 for the insulating plate body 21 of the insulating plate 201, partially fixing together the base material 24 for the insulating plate body and the sheet-like filter base material 26 laminated thereon by ultrasonic welding to form the insulating plate base material 27. Therefore, the base material 24 for the insulating plate body and the filter base material 26 can be integrally handled, thereby achieving high workability. Then, the insulating plate base material 27 is formed into the predetermined shape to produce the insulating plate 20. Therefore, the insulating plate 20 provided with the filter member 22 can be produced.

Next, a nonaqueous electrolyte secondary cell according to a second embodiment is described.

Figure 13:
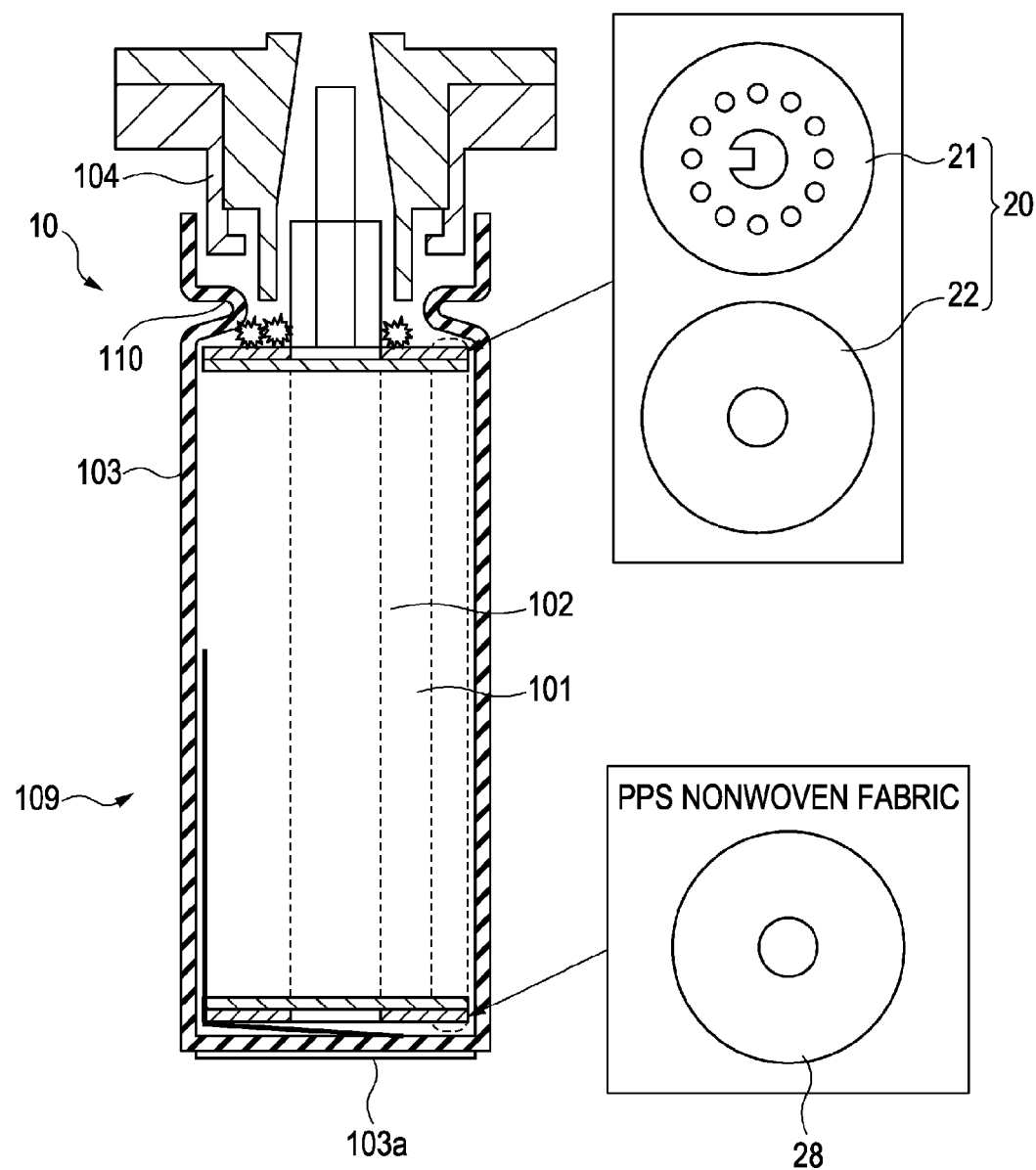
FIG. 13 is a sectional view of a nonaqueous electrolyte secondary cell according to an embodiment.

As shown in FIG. 13, a nonaqueous electrolyte secondary cell 10 according to a second embodiment includes a cell element 101 formed by stacking cathodes 105 and anodes 106 through separators 107, a cell can 109 including a can body 103 which houses the cell element 101, and a cover member 104 which closes an opening of the can body 103 to seal the cell element 101, an insulating plate 20 interposed between the cell element 101 and the cover member 104, and an electrolyte 102 injected into the cell can 109 through injection holes 21*a* provided in the insulating plate 20.

Figure 15:
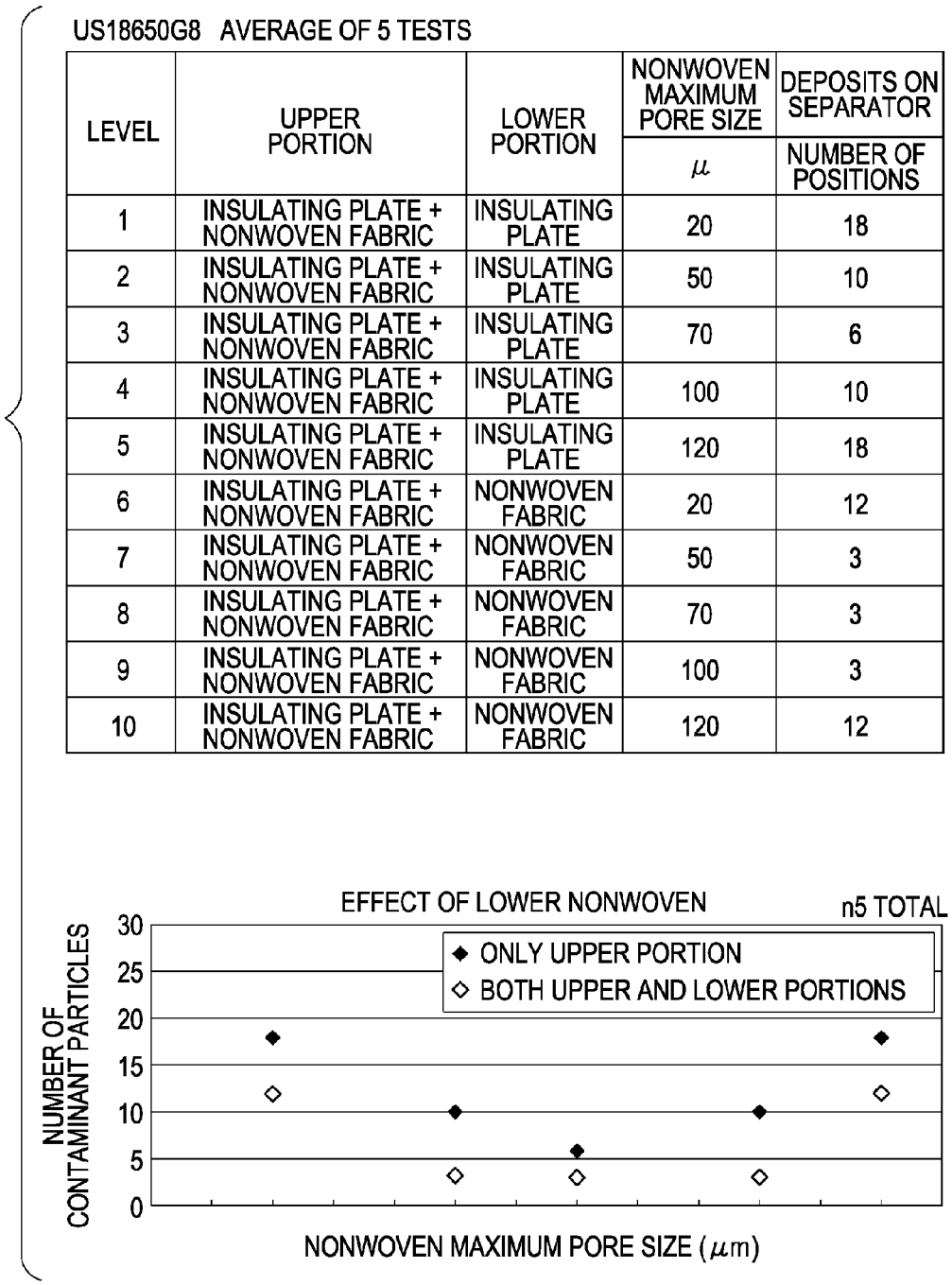
FIG. 15 shows a table and a graph showing comparison of the amounts of contaminant entering in a case where a nonwoven fabric is provided between a cell element and the bottom of a cell can to a case where a related-art insulating plate is provided.

FIG. 14 shows a table and a graph showing comparison of the number of times of falling until voltage drop between a case where the insulating plate 20 is provided between the cell element 101 and the cover member 104 and a case where only a nonwoven fabric is provided to a case where a related-art insulating plate is used. As shown in FIG. 15, when the insulating plate body 21 and the filter member 22 are used, the number of times of falling until a voltage drop occurs is increased as compared with the case in which the related-art insulating plate not including the filter member 22 is used. On the other hand, when only the nonwoven fabric is used, the number of times of falling until a voltage drop occurs is decreased as compared with the case in which the related-art insulating plate is used. This indicates that resistance to impact such as dropping or the like is enhanced by using the insulating plate 20.

In the nonaqueous electrolyte secondary cell 10 described above, the cell element 101 formed by stacking the cathodes 105 and the anodes 106 through the separators 107 is housed in the can body 103 of the cell can 109, and the insulating plate 20 is interposed between the cell element 101 and the cover member 104 which closes an opening of the can body 103. The insulating plate 20 includes the plate-shaped insulating plate body 21 having insulating property, the injection holes 21*a* which pass through the insulating plate body 21 and through which the electrolyte 102 can be injected, and the filter member 22 made of a nonwoven fabric and provided on one of the surfaces of the insulating plate body 21 so as to cover the injection holes 21*a*. Therefore, contaminants such as metal powder can be securely prevented from entering the cell element 101 when the electrolyte 102 is injected, thereby preventing internal short circuiting and appropriately utilizing the performance of the nonaqueous electrolyte secondary cell 10. In addition, the filter member 22 is interposed between the roll end of the cell element 101 and the cover member 104 which seals the opening of the can body 103 when the cell element 101 is housed in the can body 103 of the cell can 109, the cell element 101 being formed by stacking the cathodes 105 and the anodes 106 through the separators 107. Therefore, movement of the cell element 101 in the cell can 109 is suppressed, thereby improving impact resistance and vibration resistance.

In addition to the above-described insulating plate 20, a nonwoven fabric 28 is preferably provided between the cell element 101 and the bottom 109*a* of the cell can 109.

FIG. 15 shows a table and a graph showing comparison of the amounts of contaminant entering between a case where the nonwoven fabric 28 is provided between the cell element 101 and the bottom 109*a* of the cell can 109 and a case where a related-art insulating plate is provided. FIG. 15 indicates that when the nonwoven fabric 28 is provided between the cell element 101 and the bottom 109*a* of the cell can 109, the amount of contaminant entering is decreased as compared with the case in which only the above-described insulating plate 20 is provided between the cell element 101 and the cover member 104.

Therefore, the insulating plate 20 is interposed between the cell element 101 and the cover member 104 which closes an opening of the can body 103, and thus contaminants such as metal powder can be securely prevented from entering the cell element 101 when the electrolyte 102 is injected, thereby preventing internal short circuiting. Further, the nonwoven fabric 28 is interposed between the cell element 101 and the bottom 103*a* of the can body 103, and thus metal powder produced by welding of the can bottom can be securely prevented from entering the cell element 101 when the electrolyte 102 is injected, thereby preventing internal short circuiting and appropriately utilizing the performance of the nonaqueous electrolyte secondary cell 10. In addition, the filter member 22 or the nonwoven fabric 28 is interposed between the roll end of the cell element 101 and the cover member 104 and between the roll end and the bottom 103*a* of the can body 103 when the cell element 101 is housed in the can body 103 of the cell can 109. Therefore, movement of the cell element 101 in the cell can 109 is suppressed, thereby improving impact resistance and vibration resistance.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An insulating plate of a nonaqueous electrolyte secondary cell which is interposed between a cell element and a cover member in a nonaqueous electrolyte secondary cell including the cell element formed by stacking cathodes and anodes through separators, a cell can including a can body which houses the cell element and the cover member which closes an opening of the can body to seal the cell element, and an electrolyte injected into the cell can, the insulating plate comprising:
   a plate-shaped insulating plate body having insulating property;
   an injection hole which passes through the insulating plate body in the thickness direction and through which the electrolyte can be injected; and
   a filter member permeable to only the electrolyte and provided on one of the surfaces of the insulating plate body so as to cover the injection hole.

2. The insulating plate of a nonaqueous electrolyte secondary cell according to claim 1, wherein the insulating plate body is made of a thermoplastic resin.

3. The insulating plate of a nonaqueous electrolyte secondary cell according to claim 1, wherein the filter member is made of a nonwoven fabric composed of fibers and has a maximum pore size of 20 to 120 μm and a Metsuke of 25 to 150 g/m$^2$.

4. The insulating plate of a nonaqueous electrolyte secondary cell according to claim 3, wherein a binder is mixed in the filter member.

5. The insulating plate of a nonaqueous electrolyte secondary cell according to claim 3, wherein the filter member is pressed.

6. The insulating plate of a nonaqueous electrolyte secondary cell according to claim 1, wherein the insulating plate body and the filter member are partially welded by ultrasonic waves.

7. The insulating plate of a nonaqueous electrolyte secondary cell according to claim 6, wherein the injection hole is provided at a position inward of the caulking position for fixing the cover member to the can body, and the welding position between the insulating plate body and the filter member is inward of the injection hole.

8. The insulating plate of a nonaqueous electrolyte secondary cell according to claim 1, wherein the physical property values of the insulating plate body are close to those of the filter member.

9. A nonaqueous electrolyte secondary cell comprising:
   a cell element formed by stacking cathodes and anodes through separators;
   a cell can including a can body which houses the cell element and a cover member which closes an opening of the can body to seal the cell element;
   an insulating plate interposed between the cell element and the cover member; and
   an electrolyte injected into the cell can through an injection hole provided in the insulating plate,
   wherein the insulating plate includes
   a plate-shaped insulating plate body having insulating property,
   an injection hole which passes through the insulating plate body in the thickness direction and through which the electrolyte can be injected, and
   a filter member permeable to only the electrolyte and provided on one of the surfaces of the insulating plate body so as to cover the injection hole.

10. A nonaqueous electrolyte secondary cell comprising:
    a cell element formed by stacking cathodes and anodes through separators;
    a cell can including a can body which houses the cell element and a cover member which closes an opening of the can body to seal the cell element;
    an electrolyte injected into the cell can;
    an insulating plate interposed between the cell element and the cover member; and
    a nonwoven fabric provided between the cell element and the bottom of the cell can,
    wherein the insulating plate includes
    a plate-shaped insulating plate body having insulating property,
    an injection hole which passes through the insulating plate body in the thickness direction and through which the electrolyte can be injected, and
    a filter member permeable to only the electrolyte and provided on one of the surfaces of the insulating plate body so as to cover the injection hole.

11. The nonaqueous electrolyte secondary cell according to claim 9, wherein the insulating plate body is made of a thermoplastic resin.

12. The nonaqueous electrolyte secondary cell according to claim 9, wherein the filter member is made of a nonwoven fabric composed of fibers and has a maximum pore size of 20 to 120 μm and a Metsuke of 25 to 150 g/m$^2$.

13. The nonaqueous electrolyte secondary cell according to claim 12, wherein a binder is mixed in the filter member.

14. The nonaqueous electrolyte secondary cell according to claim 10, wherein the insulating plate body is made of a thermoplastic resin.

15. The nonaqueous electrolyte secondary cell according to claim 10, wherein the filter member is made of a nonwoven fabric composed of fibers and has a maximum pore size of 20 to 120 μm and a Metsuke of 25 to 150 g/m$^2$.

16. The nonaqueous electrolyte secondary cell according to claim 15, wherein a binder is mixed in the filter member.

* * * * *